United States Patent [19]

Munz

[11] Patent Number: 4,627,780

[45] Date of Patent: Dec. 9, 1986

[54] FORWARDLY DUMPABLE TRAILER

[76] Inventor: Ethiel L. Munz, P.O. Box 1383, Hawaiian Gardens, Calif. 90716

[21] Appl. No.: 697,456

[22] Filed: Feb. 1, 1985

[51] Int. Cl.⁴ .............................................. B60P 1/16
[52] U.S. Cl. ..................... 414/346; 414/350; 414/409; 414/482; 298/8 T; 298/12; 298/15; 298/17.6
[58] Field of Search ............... 414/340, 343, 345, 346, 414/350, 406, 409, 469, 482, 491, 679; 298/5, 8 T, 8 R, 12, 15, 17.6, 20 R

[56] References Cited

U.S. PATENT DOCUMENTS

| | | | |
|---|---|---|---|
| 1,529,479 | 3/1925 | Furr | 298/20 R |
| 2,072,998 | 3/1937 | Allin | 298/18 |
| 2,539,507 | 1/1951 | Corning | 298/20 R |
| 2,606,674 | 8/1952 | Edwards | 414/469 |
| 2,620,225 | 12/1952 | Hutchinson | 298/22 |
| 2,697,609 | 12/1954 | Chase | 239/657 |
| 3,316,019 | 4/1967 | Flowers | 298/17.6 |
| 3,378,302 | 4/1968 | Doeglas | 298/8 |
| 3,531,007 | 9/1970 | Leijon | 414/705 |
| 3,620,458 | 11/1971 | Kitchener | 239/657 |
| 3,670,909 | 6/1972 | Holland | 414/343 X |
| 3,674,312 | 7/1972 | O'Rear | 298/8 T |
| 3,833,263 | 9/1974 | Jackson | 298/5 |
| 3,907,364 | 9/1975 | Hnath | 298/11 |
| 4,056,283 | 11/1977 | Pow | 298/17.6 |
| 4,141,591 | 2/1979 | Spicer | 298/17.6 |
| 4,220,438 | 9/1980 | Anderson | 414/705 |

FOREIGN PATENT DOCUMENTS

| | | | |
|---|---|---|---|
| 574271 | 4/1959 | Canada | 414/340 |
| 703204 | 1/1941 | Fed. Rep. of Germany | 298/17.6 |
| 559296 | 3/1957 | Italy | 298/8 R |
| 683220 | 2/1965 | Italy | 414/346 |

Primary Examiner—Robert J. Spar
Assistant Examiner—Ken Muncy
Attorney, Agent, or Firm—Fulwider, Patton, Rieber, Lee & Utecht

[57] ABSTRACT

There is disclosed a forwardly dumpable trailer including an intermediate frame mounted on a transverse axle and carrying a forwardly and rearwardly shiftable trailer frame. A trailer box is mounted on the intermediate frame and is shiftable from a rearward position on the trailer frame to a forward position adjacent a truck box to which the trailer is hitched. Hydraulic cylinders are interconnected between the dump box and intermediate frame for raising the rearward end of the trailer box to dump the trailer load forwardly into the truck box.

5 Claims, 8 Drawing Figures

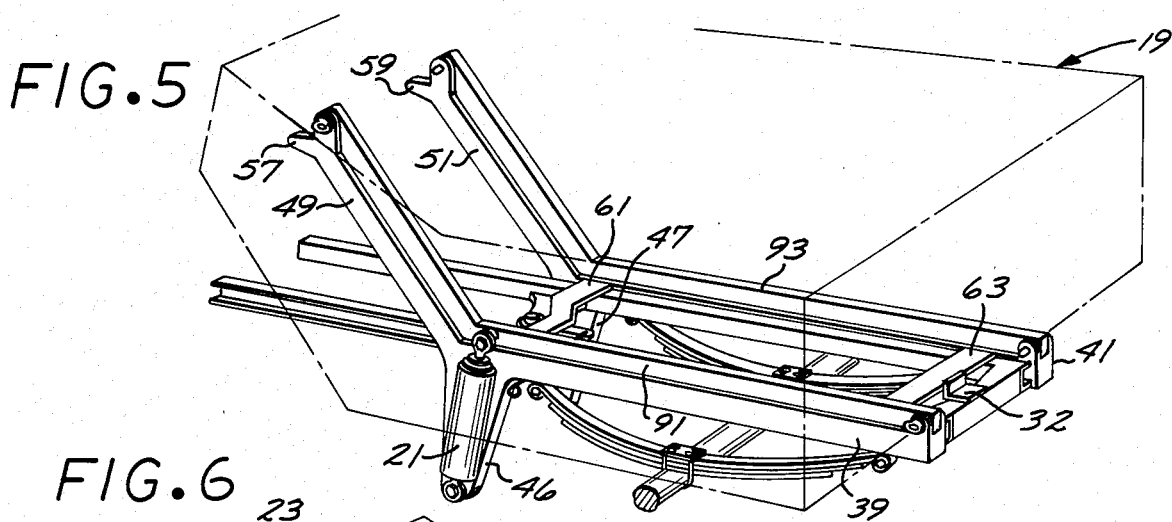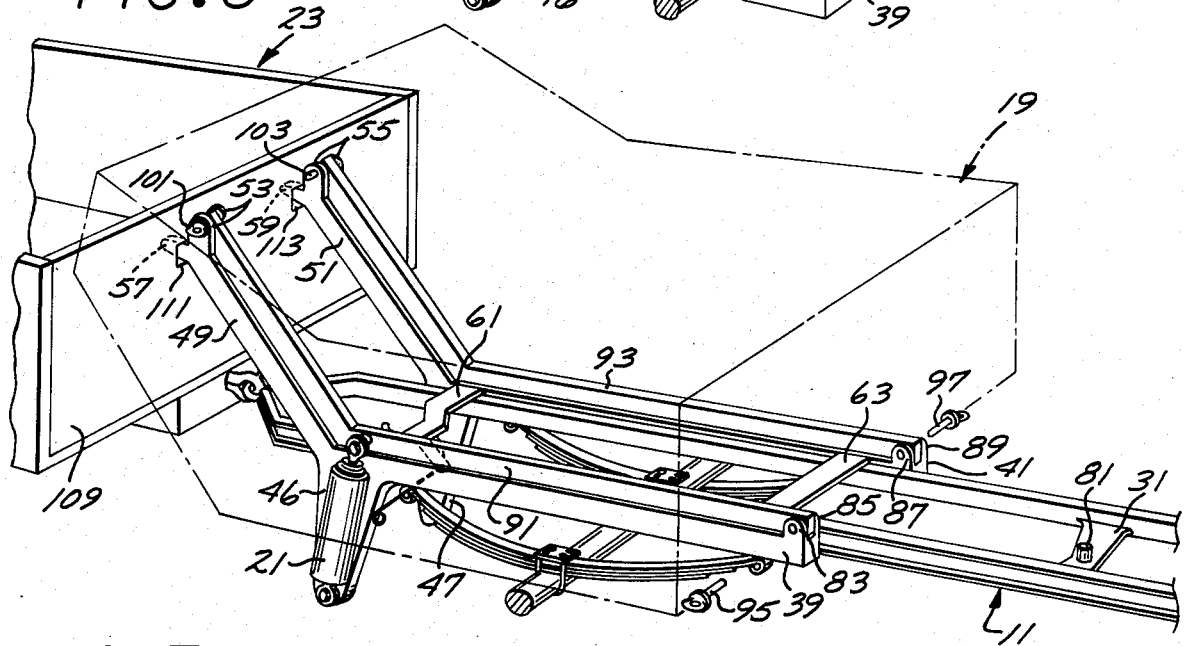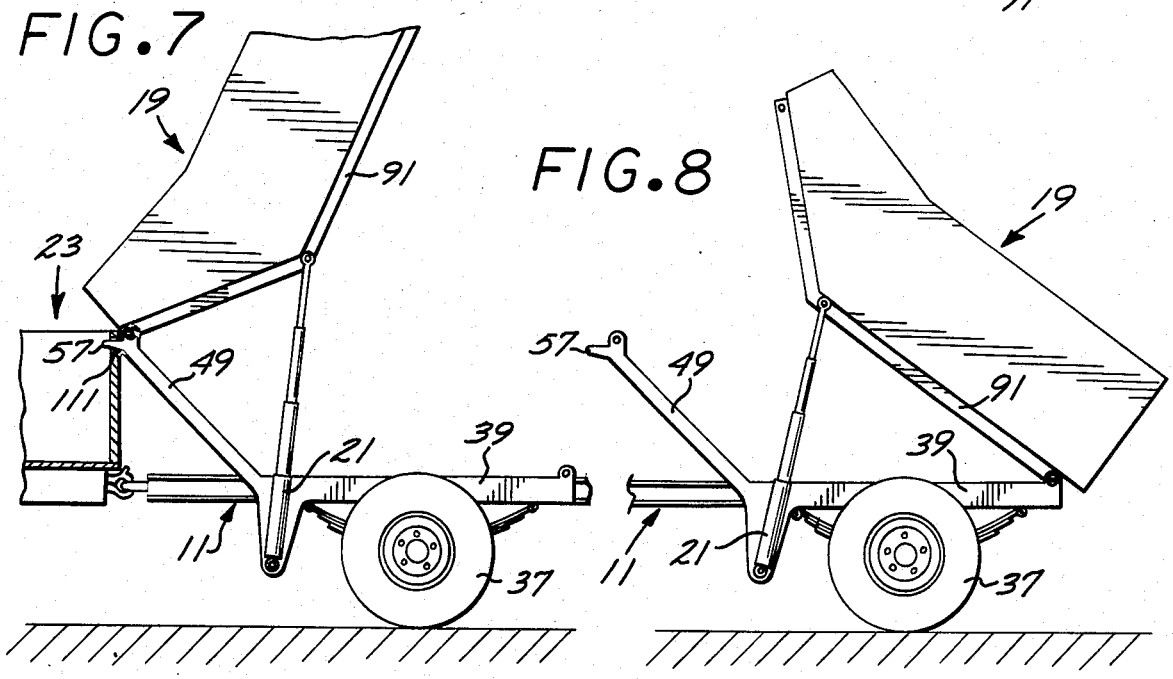

FORWARDLY DUMPABLE TRAILER

BACKGROUND OF THE INVENTION

1. Field of the Invention

The present invention relates to truck trailers.

2. Description of the Prior Art

Due to load restrictions on public highways, and general mobility and convenience considerations, ten wheel dump trucks are losing their popularity for certain applications. Typical dump truck, or spreader truck power plants have more than adequate capacity for hauling heavy loads, far exceeding that which may be conveniently loaded onto, and transported in the truck box under modern load restrictions. Consequently, trailers are frequently hitched behind a truck to carry additional payload which would exceed the limitation imposed on the axles of the truck. Such truck-trailer combinations have proven satisfactory for many applications but are impractical in many applications where spreading of the load, for instance asphalt, is required at the work site.

Most trailers do not incorporate the relatively expensive spreader attachments required for spreading of the load, and there is no practical means presently known for transferring the load from the trailer box to the truck box so that the truck box spreader may be conveniently utilized for spreading the trailer load. Consequently, there exists a need for a practical means for rapidly and conveniently transferring the trailer load to the truck box such that the truck spreader may be utilized in spreading both the truck load and the trailer load. To achieve this end, it is desirable to provide an efficient means for dumping the truck load forwardly from the trailer into the truck box.

It is further desirable that the trailer load be carried over the axle of the trailer, with such axle spaced a minimum distance behind the truck during transport to the job site. The load must then be shiftable forwardly on the trailer to a location adjacent the truck box for direct dumping thereinto.

It is known to provide dual purpose trucks which dump both forwardly and rearwardly. One such dual purpose dump truck which is capable of being used as a sander or spreader is disclosed in U.S. Pat. No. 3,620,458 to Albert Rath, issued Nov. 16, 1971. This truck includes a load supporting frame on which a dumping box is mounted. The dumping box is capable of selective pivotal connection either at its rear or at its front end to the frame, and toggle/cylinder means are provided for urging a central point of the box upwardly with respect to the frame, in either mode of pivotal attachment. When the rear pivot is connected, energization of the cylinder raises the box in the normal dumping mode in which the contents slide to the rear. When the forward pivot is connected, raising of the dump box gives it a forward slope and the contents thereof slide toward the front.

Other dual purpose dump box construction is shown in U.S. Pat. No. 4,056,283, issued Nov. 1, 1977. Forwardly and rearwardly dumpable truck boxes typified by these prior art patents, while satisfactory for their intended purposes, would not perform satisfactorily as forwardly dumpable trailer boxes since loading requirements dictate that the trailer load during transportation be shifted so far rearwardly on the trailer frame that simply dumping such load forwardly from its transport position on the trailer axle would not serve to place the trailer load in the truck box.

Another style of a forwardly dumpable truck box is shown in U.S. Pat. No. 2,697,609 to S. J. Chase et al, issued Dec. 21, 1954. Again, while serving its purpose of shifting the load forwardly to a forwardly located spreader, such an arrangement would not afford the desired object of this invention wherein the load is to be transferred from the trailer box to the truck box.

Other objects and advantages of the present invention will become apparent from a consideration of the following detailed description of the preferred embodiment, taken in conjunction with the accompanying drawings.

DESCRIPTION OF THE DRAWINGS

FIG. 5 is a broken perspective view, in an enlarged scale, of the forwardly dumpable trailer shown in FIG. 1 with the trailer box shown in phantom lines;

FIG. 6 is a perspective view similar to FIG. 5 but including the rear extremity of the truck to which the trailer is hitched and showing the trailer box shifted forwardly on the trailer;

FIG. 7 is a side elevational view, partially in section, of the forwardly dumpable trailer shown in FIG. 1 with the trailer box dumped forwardly;

FIG. 8 is a side elevational view of the forwardly dumpable trailer shown in FIG. 1 but with the trailer box in its rearward dump mode.

DESCRIPTION OF THE PREFERRED EMBODIMENT

Figure 1:
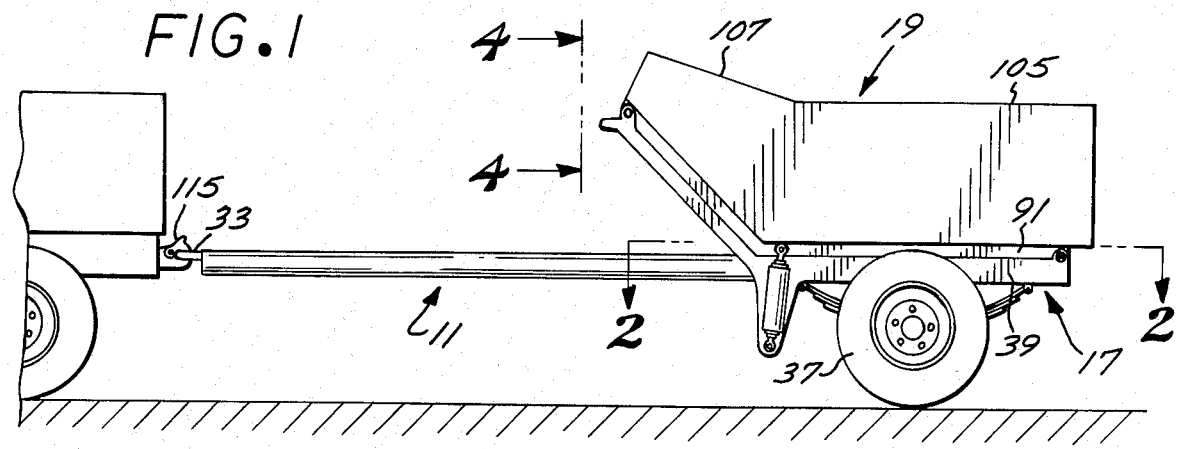
FIG. 1 is a side view of a forwardly dumpable trailer embodying the present invention.

The forward dumpable trailer of the present invention includes, generally, a trailer frame 11 formed with laterally disposed, longitudinally extending side rails 13 and 15 (FIG. 3) which mount to the opposite sides of an intermediate frame 17. A trailer dump box 19 is mounted on the intermediate frame 17 to be shifted forwardly relative to the trailer frame to the position shown in FIGS. 6 and 7 such that hoisting cylinders 21 may be actuated to raise the rear of the box 19 to dump its load forwardly into the truck box 23 (FIG. 7).

Figure 2:
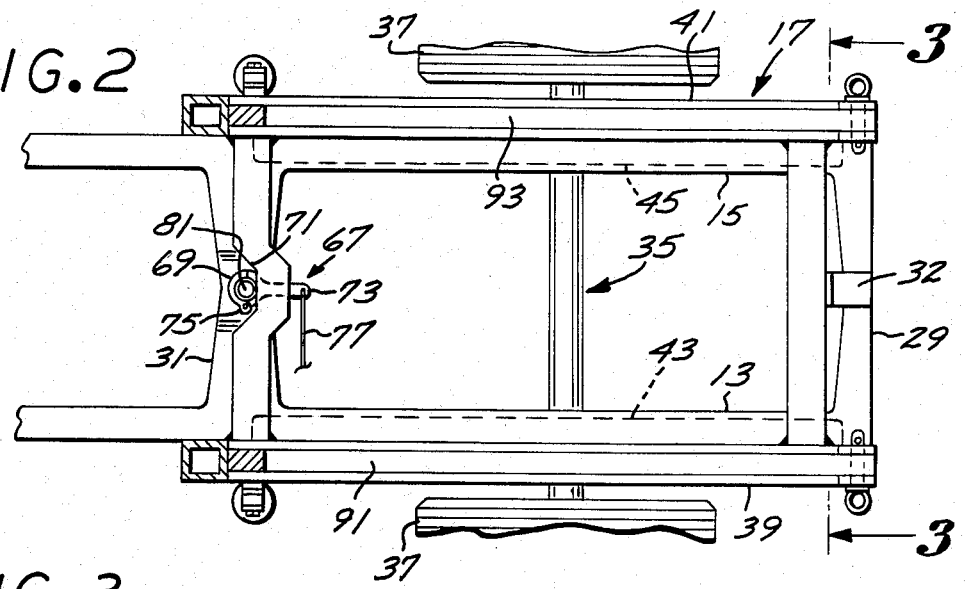
FIG. 2 is a horizontal selectional view, in an enlarged scale, taken along the lines 2—2 of FIG. 1.
Figure 3:
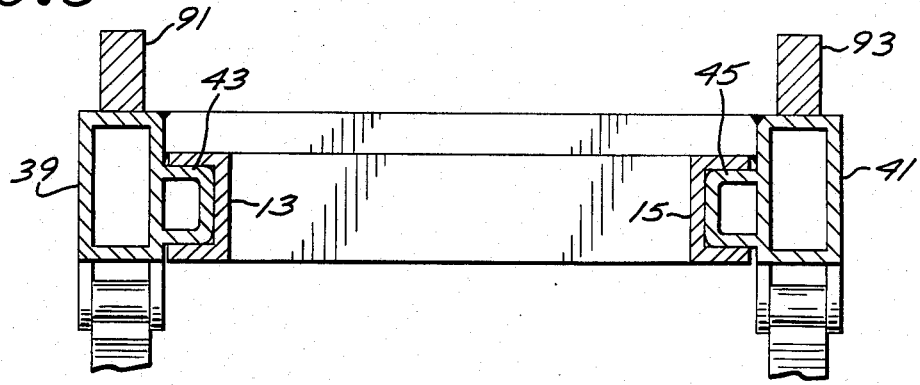
FIG. 3 is a transverse selectional view, in an enlarged scale, taken along the line 3—3 of FIG. 2.
Figure 4:
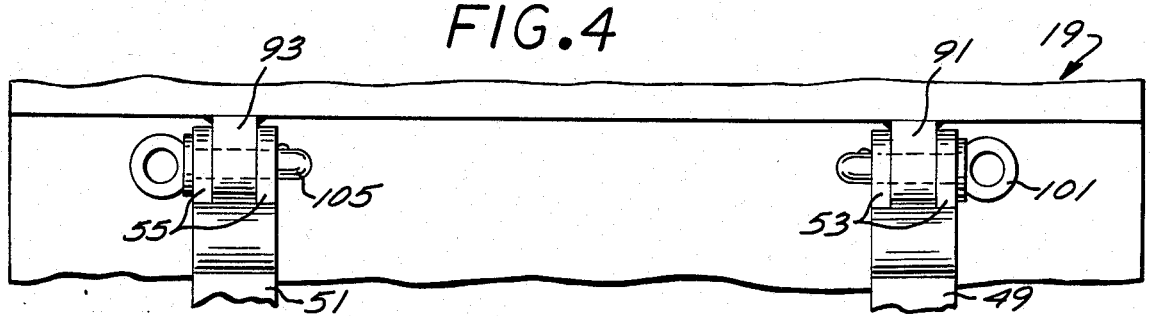
FIG. 4 is a vertical view, in an enlarged scale, taken along the lines 4—4 of FIG. 1.

Referring to FIGS. 1, 2 and 3, the trailer frame 11 is constructed with a pair of outwardly opening, laterally spaced apart longitudinal, outwardly opening C-channels which form the side rails 13 and 15. Such side rails 13 and 15 act as tracks and are connected together by means of a rear cross member 29 (FIG. 2) and an intermediate cross member 31, and themselves, angle inwardly at their forward extremities to form a hitch 33 (FIG. 1). Mounted centrally on the rear cross member 29 is a stop angle 32 which limits rearward travel of the trailer frame relative to the intermediate frame.

The intermediate frame 17 is carried on a transverse axle, generally designated 35 which is, in turn, supported on trailer wheels 37. Such intermediate frame 17 is formed on its opposite sides with a pair of box beams 39 and 41 (FIG. 3) which mount on the inside faces thereof respective confronting C-channels 43 and 45. The C-channels 43 and 45 are slideably received in the outwardly opening side rails 13 and 15 to act as sliders thus enabling the intermediate frame 17 to slide forwardly and rearwardly relative to the rails 13 and 15. It will be appreciated that in practice the trailer frame may be constructed of an elongated I-beam with the intermediate frame centered laterally thereon. Friction reducing means, such as rollers or wheels will be interposed between the trailer frame 11 and intermediate frame 17 to carry the weight of such intermediate frame and guide it on the trailer frame.

Referring to FIGS. 5–9, the side beams 39 and 41 of the intermediate frame 17 are formed at their forward extremities with downwardly depending legs 46 and 47. The intermediate frame 17 is also formed at its forward extremity with upwardly and forwardly inclined support arms 49 and 51. The arms 49 and 51 are formed at their upper extremities with respective upwardly projecting ears 53 and 55, as well as forwardly projecting prongs 57 and 59, respectively.

Referring to FIG. 6 the side beams 39 and 41 of the intermediate frame 11 are connected together at the forward and rearward extremities by means of transverse frame members 61 and 63. Referring to FIG. 2, mounted on the underside of the forward frame member 61 is a pivotal latch, generally designated 67. The latch 67 is formed with a rearwardly opening stationary half-ring 69 confronted by a forwardly opening capture half-ring 71 formed with a lever arm 73. The capture ring 71 is carried from the stationary ring 69 by means of a pivot pin 75. Connected with the free end of the lever arm 73 is a retractor rod 77 which may be pulled to rotate the capture ring 71 in a clockwise direction about the pivot pin 75 as viewed in FIG. 2 to thus unlatch from a vertical stub post 81 mounted on the cross member 31 of the trailer frame 11 (FIG. 6).

Formed on the top side of the rear extremity of the intermediate frame side beams 39 and 41 are respective pairs of upstanding ears 83, 85, 87 and 89 which are formed with transverse bores that complementarily align with corresponding transverse bores formed in the rear extremities of respective trailer box frame members 91 and 93 for selective receipt of pivot pins 95 and 97 (FIG. 6). It will be appreciated that the trailer box frame members 91 and 93 are formed to complementarily mount on the intermediate frame 11 and are forward with horizontal runs and then angle upwardly and forwardly to complementarily overlie the intermediate frame arms 49 and 51. Such box frame members 91 and 93 are formed at their forward extremities with bores for complemental receipt of pivot pins 101 and 103.

The trailer box 19 is formed with a rectangular body section 105 and an upwardly and forwardly angled chute 107 which overlies the upwardly and forwardly angled immediate frame arms 49 and 51.

Referring to FIGS. 6 and 7 the truck box 23 includes a rear wall 109 which is formed with laterally spaced apart rearwardly opening sockets 111 and 113 which selectively receive the respective forwardly projecting prongs 57 and 59 of the intermediate frame 11.

It will be appreciated that, in practice, hydraulic lines will typically run from the truck to the hydraulic cylinders 21 and trailer brakes.

In operation, the hitch 33 of the trailer frame 11 is connected with the trailer hitch 115 of the truck with the intermediate frame 17 and shifted to the rearward position shown in FIG. 1. The latch 67 is latched about the stub post 81 to hold the box in this rearward position. The truck box 23 and trailer box 19 may then be fully loaded with, for instance, asphalt. The loaded truck may then be utilized to haul the trailer to the work site. Upon arrival at the work site, the trailer may conveniently be unhitched from the truck and the spreader (not shown) in the truck utilized to spread the truck's load of asphalt.

Thereafter, the truck may be re-hitched to the trailer frame 11, the latch rod 77 pulled to pivot the capture half-ring 71 about its pivot 75 (FIG. 2) to unlatch the intermediate frame 17 for forward shifting relative to the trailer frame 11. The brakes of the trailer wheels 37 may then be set and the truck backed up to drive the trailer frame 11 rearwardly relative to the intermediate frame 17 thus serving to shift such intermediate frame to the forward position on the trailer frame 11 shown in FIG. 6. Upon full forward travel of the intermediate frame 17 relative to the trailer frame 11, the prongs 57 and 59 will engage the respective sockets 111 and 113, thus serving to lock the front end of the trailer against vertical movement relative to the back wall 109 of the truck box 23. The aft lock pins 95 and 97 may then be removed as shown in FIG. 6 and the hydraulic cylinders 21 actuated to lift the aft end of the trailer upwardly to the position shown in FIG. 7, thus dumping the load of the trailer box forwardly into the previously emptied truck box 23.

It will be appreciated that during such dumping maneuver, the interengagement of the prongs 57 and 59 within the sockets 111 and 113 will serve to cause the intermediate frame lock arms 49 and 51 to brace the rear end of the truck against tipping downwardly about the rear wheels of the truck to thus prevent unintended raising of the front wheels thereof off the ground under the weight of the load of the trailer.

After dumping of the trailer load in the truck box 23 is completed, the cylinders 21 may be retracted to lower the box to its lowered position on the intermediate frame 17 and the forward pivot pins 95 and 97 (FIG. 6) reinserted. With the brakes of the wheels 37 set, the trailer frame 11 may be drawn forwardly relative to the intermediate frame 17 to and again latch the latch 67 about the stub post 81 (FIG. 2) to maintain the box 19 in its travel position at the rear of the trailer frame 11. The truck may then be employed to spread the asphalt load which has just been dumped from the trailer box 19.

As an additional feature, it will be appreciated that the trailer may be used as a dump trailer. In that mode, the intermediate frame 17 is left in its rearward position as shown in FIG. 8, the forward pivot pins 101 and 103 withdrawn and the cylinders 21 actuated to raise the forward end of the dump box 19.

From the foregoing it will be apparent that the forwardly dumpable trailer of the present invention provides an economic and convenient means for transporting an additional load to a work site and then quickly transferring that load to a truck box for spreading of that load using the truck spreader.

I claim:

1. A forwardly dumpable trailer to be hauled behind a truck having a trailer hitch and an upwardly opening box, said trailer comprising:

a transverse support axle;
an intermediate frame carried on said axle, including longitudinally extending slides;
latch means mounted on said intermediate frame and including lock and unlock modes;
a trailer frame including at least one forwardly and rearwardly extending rail formed with tracks slidably receiving said slides for slidable travel longitudinally therealong, to shift said intermediate frame from a transport location at the rear of said trailer to a forward position adjacent said truck box;

hitch means at the forward end of said trailer frame for hitching to said trailer hitch;

a latch element on said trailer frame, engageable with said latch means when said intermediate frame is in said transport location to lock said trailer frame against shifting relative to said intermediate frame and releasable from said latch means when said latch means is in said unlock mode;

a trailer box mounted on said intermediate frame for receiving a load and pivotally connected thereto at its front extremity to accommodate tilting of the rear end of said trailer box upwardly to a forward dump position;

said trailer box being formed at its forward extremity with a forwardly opening dump chute arranged to, when said trailer box is in said forward position, and also in said forward dump position, dump said load in said truck box; and lift means coupled between said intermediate frame of said trailer box for tilting selectively said box to said forward dump position whereby said intermediate dump frame, and support axle, may be selectively shifted to said rearward transport position on said rails and latched in position by said latch means, and may be subsequently shifted to said forward position and said lift means actuated to raise the rear end of said dump box to said forward dump position to thereby cause said load to be dumped out said chute into said truck box.

2. A forwardly dumpable trailer as set forth in claim 1 wherein:

said intermediate frame includes coupling means engagable with said truck dump box when said intermediate frame is in said forward position to couple with said dump box to limit relative movement between said intermediate frame and said truck box.

3. A forwardly dumpable trailer as set forth in claim 1 wherein:

said lift means includes at least one fluid cylinder connected between said intermediate frame and trailer box.

4. A forwardly dumpable trailer as set forth in claim 1 wherein:

said forward extemity of said trailer box is releasable from said intermediate frame; and said trailer includes;

means releasably connecting the rear extremity of said trailer box to said intermediate frame and wherein;

said lifting means is connected centrally to said intermediate frame such that actuation thereof to elevate said trailer box with either said forward or rearward extremities released from said intermediate frame will cause the released end to be raised to cause said trailer dump box to dump rearwardly and forwardly, respectively.

5. A forwardly dumpable trailer as set forth in claim 1 wherein:

said truck box includes a back wall formed with at least one rearwardly opening socket; and said intermediate frame includes, at least, one forwardly projecting arm terminating in a prong arranged to be received in said socket when said intermediate frame is in said forward position.

* * * * *